March 14, 1950  F. J. ANDERSON  2,500,236
MULTIPLE MOVEMENT GATE
Filed June 27, 1946  2 Sheets-Sheet 1
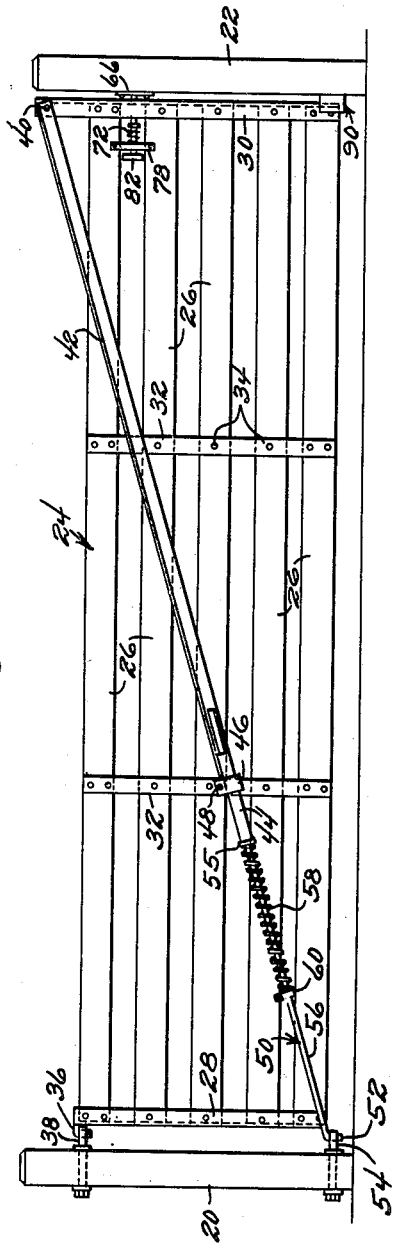
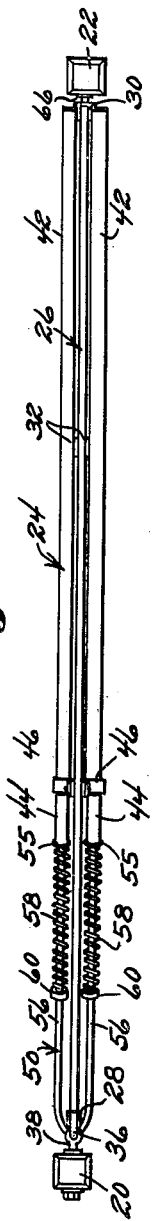
INVENTOR.
Fred J. Anderson
ATTORNEYS

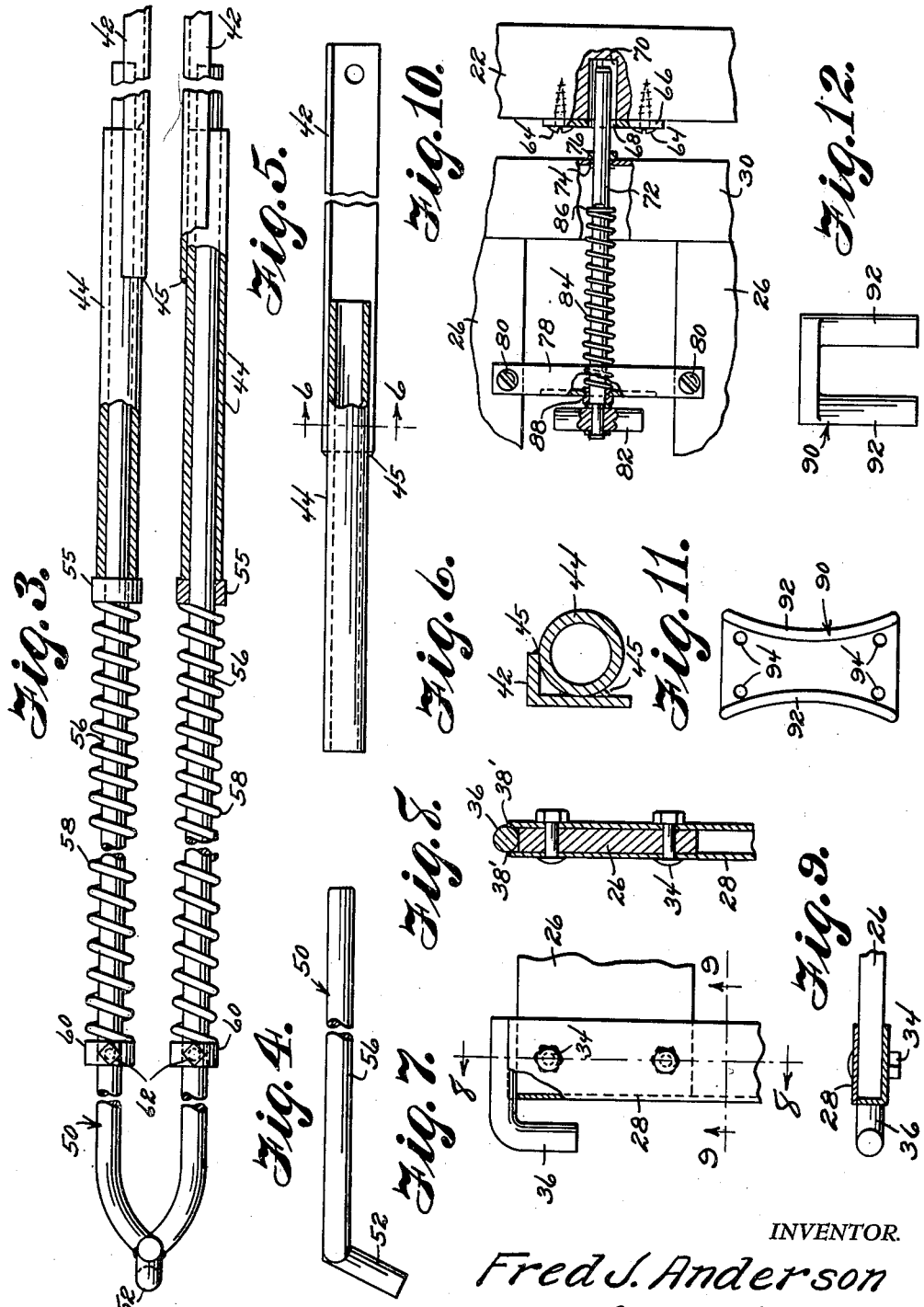

Patented Mar. 14, 1950

2,500,236

UNITED STATES PATENT OFFICE 2,500,236

MULTIPLE MOVEMENT GATE

Fred J. Anderson, Aurora, Ill.

Application June 27, 1946, Serial No. 679,784

1 Claim. (Cl. 39—78)

This invention relates to a farm gate.

The most important object of this invention is to provide a gate that is of the floating type that will not drag or sag.

This particular type of gate will outlast the gates in use at the present time which are only supported at the hinge end, since these gates will after a short period of use twist, sag and drag on the ground.

Another object of the invention therefore is to provide a gate that is durable, withstanding the strains of hard and continuous usage, is simple in operation and construction, and is capable of being manufactured at a low cost.

With the above and other objects and advantages in view the invention consists of the details of construction, arrangement and combination of parts more fully hereinafter described, claimed and illustrated in the accompanying drawings in which:

Figure 1 is a side elevation of an embodiment of the invention.

Figure 2 is a top plan view thereof.

Figure 3 is a detailed view partly in section of the gate suspension means.

Figure 4 is a detailed view of the post attaching end of the suspension means.

Figure 5 is a detailed side view of one of the tubular members of the suspension means.

Figure 6 is a sectional view on the line 6—6 of Figure 5.

Figure 7 is a side view of the hanger for the upper end of the gate.

Figure 8 is a sectional view on the line 8—8 of Figure 7.

Figure 9 is a bottom view of Figure 7, looking in the direction of the arrows on the line 9—9 of Figure 7.

Figure 10 is a detailed view of the latch.

Figure 11 is a front view of the bracket for the lower front end of the gate and Figure 12 is a plain view thereof.

Referring more in detail to the drawing the reference numeral 20 designates the gate post on which the gate is suspended and 22 the gate post to which the gate is latched.

The gate 24 comprises the longitudinally relatively spaced and parallel members 26, which are joined at their ends by the vertical channel iron members 28 and 30 respectively. Intermediate of the members 28 and 30 and spaced therefrom are the strap members 32, these members being connected to the longitudinal members by fasteners 34. The shape of the members 28 and 30 protect the ends of the members 26.

Secured at the suspension end of the gate 24 to the top edge thereof is the pintle member 36 which is received in the hinge 38 secured to the top of the post 20, the member 36 supporting the top of the gate at this point. As shown in Figures 7, 8 and 9, the side flanges of the member 28 extend beyond the upper member 26 to receive the pintle 36 which is welded to the flanges at 38.

It will be seen that the member 30 extends beyond the upper end of the gate 24 as shown in Figure 1. Pivoted to the upper end of the member 30 by bolts 40 are the angle iron members 42 which are in opposed relations to each other on opposite sides of the gate and incline downwardly towards the opposite lower end of the gate as shown. The angle iron members 42 are secured to the short tubular members 44 by welding 45 or the like and the members 44 are slidably secured to one of the members 32 by hangers 46 pivoted to the member 32 by bolts 48.

Slidably mounted in the tubular members 44 is the U-shaped bar 50 which is provided at is base with a pintle 52 which is received in the lower hinge 54.

Collars 55 mounted on the uprights 56 of the bar 50 have the coil springs 58 mounted on the uprights 56 in contact therewith and adjustable collars 60 mounted on the uprights adjust the tension of the springs 58. Set screws 62 in the collars 60 retain the collars in fixed position on the bar after they have been adjusted.

Secured to the post 22 by screws 64 is the latch keeper plate 66 which is apertured at 68 to communicate with the seat 70 to receive the end of the bolt latch 72 mounted in the member 30. The member 30 is apertured at 74 and provided with a bushing 76 in which the latch 72 slides. A plate 78 secured intermediately of two of the members 26 by screws 80 supports the opposite end of the latch 72 on which is mounted a handle 82 for the operation of the latch 72.

A coil spring 84 engaging at one end a collar 86 on the latch 72 and a bushing 88 mounted in the plate at the other end retains the latch in the keeper until unlatched therefrom by means of the handle 82.

The lower front end of the gate is retained in position by the U-shaped bracket 90 having arcuate shaped sides 92 and the bracket is provided with apertures 94 for securing the bracket to the post 22. The points of stress on any gate are at the bottom and top corners thereof, therefore strength is added to the particular gate described if it is supported at both the top and bottom corners of the latched end. Thus the bracket 90 is used to support the bottom end since the springs 58 located one on each side of the gate which carry the weight of the latched end of the gate from the top corner thereof are so adjusted that when the gate is unlatched the latched end of the gate will rise from the ground vertically because of the adjusted compression of these two weight carrying springs. Thus the gate when closed will have its bottom corner received and retained by the bracket 90 so that the gate cannot be forced sideways from either side. When the gate is unlatched the weight carrying springs lift the bottom front corner out from the sides of the bracket to permit it to be opened on its hinges in the usual manner. Thus when the gate is latched it is firmly supported to resist pressure from either side at both its bottom and top corners.

The tension of the springs 58 can always be adjusted so that the gate is always off the ground. The tension springs 58 hanging the gate from the top corners thereof, prevent the gate from warping or twisting. Since the latched end of the gate tends to rise when unlatched, it can be adjusted to lift several feet from the ground thereby permitting the gate to clear any unevenness in the ground on either side of the gate as it is opened in either direction or above banked snow or may even open to a side hill position when the gate is in a fence at the bottom of a ravine or gulley. The springs can also be adjusted so that pigs can run under the gate while larger stock is stopped. This is accomplished by fastening the lower end of the gate to the post by a chain or similar means.

If the suspension post should sag the tension of the springs can be increased to compensate therefore and by this tension the gate can be raised any desired distance from the ground. The lower end of the gate floats and is free to move between the U-shaped bar. When the latch is unlatched the upper end of the gate will rise depending on the tension of the springs.

To close the gate the upper free end must be pushed down for the gate to latch.

The gate is suspended at the upper end only, while as stated the bottom floats free. Thus the weight of the gate is carried by the upper pintle and the upper end of the U-shaped bar, unlike gates which are hinged rigidly at top and bottom corners of one end only. Thus the gate is relieved of carrying its own weight.

It is believed the operation and advantages of the gate will be apparent to those skilled in the art and that it is to be understood that changes may be made in the details of construction, arrangement and combination of parts without departing from the spirit of the invention or the scope of the appended claim.

Having thus described the invention, what is claimed as new and desired to be secured by Letters Patent is:

A device of the character described, comprising a gate hinged at its upper end to a post, inclined angle iron members pivotally secured to the opposite upper end, tubular members secured to said angle iron members, a U-shaped bar slidable in said tubular members, hinge means on said bar for hinging said bar to said post, springs sleeved on said bar for tensioning the swinging action of said gate, collars sleeved on said bar intermediate the forward end of the springs and the tubular members, adjustable collars sleeved on said bar at the rear end of said springs, a spring pressed bolt on said gate, centrally thereof, for latching said gate in closed position, and a keeper for the lower free end of the gate so that when said gate is in closed position, said gate will resist pressure from either side at each of the four corners and the forward end of the gate can be raised vertically when in open position to clear any obstruction when swung in either direction.

FRED J. ANDERSON.

REFERENCES CITED

The following references are of record in the file of this patent:

UNITED STATES PATENTS

| Number | Name | Date |
|---|---|---|
| 582,427 | Keller | May 11, 1897 |
| 645,842 | Tennant | Mar. 20, 1900 |
| 676,429 | Ellis | June 18, 1901 |
| 816,843 | Brace | Apr. 3, 1906 |
| 855,948 | Higbe | June 4, 1907 |
| 863,244 | Weston | Aug. 13, 1907 |
| 928,798 | Rowe | July 20, 1909 |
| 1,119,558 | Whitworth | Dec. 1, 1914 |